Dec. 3, 1940.     W. J. BOYER     2,224,074
STRAP
Original Filed Aug. 29, 1935
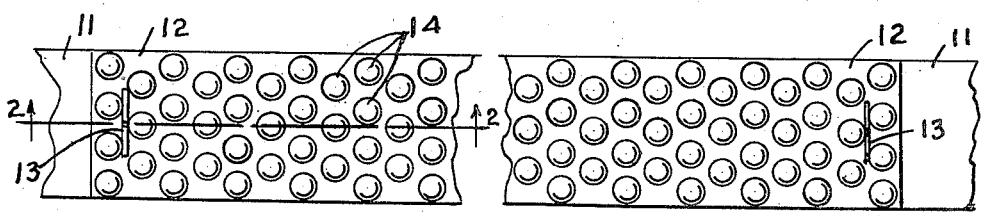
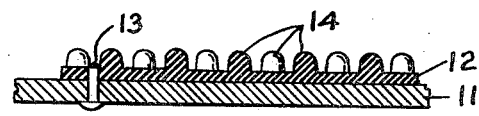
*Fig. 1.*
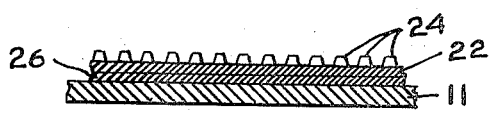
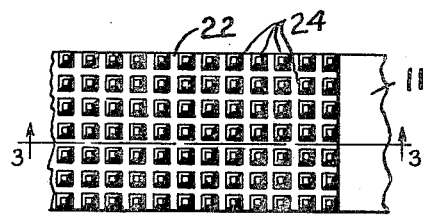
*Fig. 3.*      *Fig. 4.*
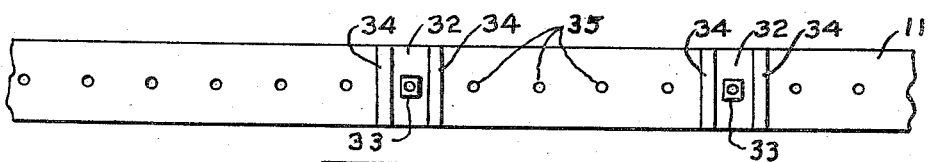
*Fig. 5.*
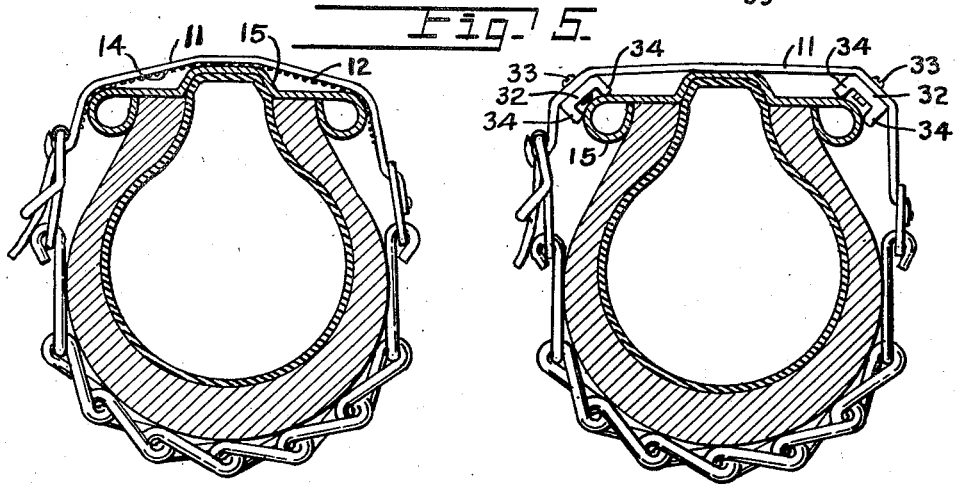
*Fig. 6.*      *Fig. 7.*
INVENTOR
William J. Boyer, deceased
By Frederick G. L. Boyer, Administrator Patented Dec. 3, 1940

2,224,074

UNITED STATES PATENT OFFICE 2,224,074

STRAP

William J. Boyer, deceased, late of Wilmington, Del., by Frederick G. L. Boyer, administrator, Hamilton, Ohio, assignor to Frederick G. L. Boyer, Hamilton, Ohio Original application August 29, 1935, Serial No. 38,479. Divided and this application July 3, 1939, Serial No. 282,713

4 Claims. (Cl. 152—237)

This invention relates primarily to anti-skid devices especially to the emergency type of anti-skid chains which are held in place on a tire by straps passing around the rim, and has for its object the provision of means for preventing slippage of straps and chains around the tire.

In chains of this type slight differences in the weight of the parts on opposite sides of the tire or a slight error in attaching them to the tire whereby the fastening on one end of the chain is located farther from the center of the wheel than that on the other side, create a condition of unbalance under centrifugal force while the car is running which tends to cause the chain structure to creep around the tire to an extent where its function is impaired.

According to the present invention means are provided on the strap which, when the strap is tightened around the rim, so greatly increase the resistance to slippage of the strap around the rim that it is greater than the centrifugal force on the unbalanced parts and consequently prevents slippage in service. This means is provided in the form of a rough surfaced, soft, compressible, but resilient member advantageously in the form of a lining to the strap on the side which contacts the rim of the wheel.

The invention will be better understood by reference to the accompanying drawing in which:

Fig. 1 is a fragmentary view of a strap provided with one form of frictional lining in accordance with the present invention;

Fig. 2 is a sectional view taken on line 2—2 of Fig. 1;

Fig. 3 is a sectional view similar to Fig. 2 but showing a modified form of friction lining, taken on line 3—3 of Fig. 4;

Fig. 4 is a fragmentary view of a strap with the lining shown in section in Fig. 3;

Fig. 5 is a view of a strap provided with an alternative friction device;

Fig. 6 is a sectional view of a tire showing a chain held in place by the strap of Fig. 1; and Fig. 7 is a similar view showing a chain held in place by the strap of Fig. 5.

Referring to Figs. 1 and 2 the strap 11 carries the tensile stress required to hold the chain to the tire. It is made of a relatively strong material which elongates but little under tension. It may be made of leather or other suitable material but is advantageously composed of rubber heavily reinforced with fabric or cord. To the strap 11 is attached a soft resilient liner 12 advantageously of gum rubber or the like. It may be attached to the strap 11 by any suitable means as by split rivets 13. It may alternatively be cemented to the face of the strap or, in case of a rubber strap, it may advantageously be vulcanized directly to the surface of the strap. The resistance to slipping has been found to be greatly increased by providing the lining with a roughened surface such as that illustrated in the figure, which is provided with knob-like projections 14. When the strap is tightened up under tension, for example, as illustrated in Fig. 6, the knobs 14 are compressed much more deeply than would be a smooth lining. Rubber being volumetrically only very slightly compressible, the knobs spread in area and press tightly against the rim 15. As the strap 11 attempts to slip around the rim the tips of the knobs 14 stick to the rim while their bodies bend causing a wedging action which tightens the whole structure and materially increases the resistance to slipping.

An alternative form for the lining is illustrated in Figs. 3 and 4. In this the surface roughness is shown in the form of a series of truncated pyramids instead of the rounded knobs. They are, however, made of a similar soft but resilient material and are thought to serve to prevent slipping of the strap in a manner analogous to that described in connection with Figs. 1 and 2. In Fig. 3 is illustrated a backing layer 26 formed integral with the strap liner 22. Such a backing layer, reinforced with fabric or cords, may advantageously be used when the liner is to be attached to the strap 11 by rivets or the like, instead of being cemented or vulcanized thereto.

The surface roughness need not take the forms illustrated but may be of almost any desired form, regular or irregular, provided the projections have the necessary softness and resilience and are spaced and proportioned so they can bend and wedge as described.

A third alternative form is illustrated in Figs. 5 and 7. Instead of a continuous lining this form comprises discrete blocks 32 which are attached to the strap 11 by rivets or bolts 33. They can be set on the strap at any location required to cooperate most effectively with the rim form by bolting them through the proper holes 35 in strap 11. Instead of projections of the type described these blocks 32 are provided with cleat-like projections 34. These projections 34 function in a manner similar to that described and in addition may be located to fit over the edges of rim 15 in a manner to still further increase their holding power, as illustrated in Fig. 7.

It should be noted that the structures of Figs. 1 to 4, when attached to the straps by rivets as shown in Figs. 1 and 2 can, if desired, be adjusted in position on the strap 11 in the same manner as can blocks 32, if a similar plurality of holes is provided in strap 11.

Another alternative liner, not illustrated, has a surface of the form commonly known as crepe. In this case the predominant roughness may be advantageously arranged transversely to the direction in which slippage is to be chiefly resisted.

While the exceptionally high resistance to slippage exerted by linings of the types illustrated and described is believed to be due to the compressing, bending, and wedging action described, these structures are found to be highly effective regardless of any theory used to explain their action.

This application covers matter first disclosed in copending application Serial No. 38,479, filed August 29, 1935, from which the present application is a division.

What is claimed is:

1. In a strap for securing emergency anti-skid chains to a rim and tire, a stress carrying member and a friction lining therefor for contacting the rim and preventing the assembly from slipping around the tire, said friction lining having a roughened surface and being made of a resilient material substantially softer than the stress carrying member.

2. In a strap for securing emergency anti-skid chains to a rim and tire, a substantially non-stretchable member and a relatively soft resilient liner having a deeply roughened surface.

3. In a strap for securing emergency anti-skid chains to a rim and tire, a stress carrying layer of reinforced rubber and a rough surfaced friction liner of relatively soft resilient rubber.

4. In a tension carrying non-slip strap structure, a substantially non-stretching member and a plurality of relatively soft, resilient projections therefrom, adapted to give greatly increased frictional resistance between said strap structure and objects with which it makes contact.

FREDERICK G. L. BOYER,
*Administrator of the Estate of William J. Boyer, Deceased.*